US011157310B2

(12) United States Patent
Zou et al.

(10) Patent No.: US 11,157,310 B2
(45) Date of Patent: Oct. 26, 2021

(54) METHOD AND SYSTEM FOR MIGRATING XML SCHEMAS IN APPLICATION RELEASES

(71) Applicants: Zhonghui Ben Zou, Shanghai (CN); Yuanzhi Michael Tang, Shanghai (CN); Chaosong Wang, Shanghai (CN)

(72) Inventors: Zhonghui Ben Zou, Shanghai (CN); Yuanzhi Michael Tang, Shanghai (CN); Chaosong Wang, Shanghai (CN)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 16/907,467

(22) Filed: Jun. 22, 2020

(65) Prior Publication Data

US 2020/0319920 A1    Oct. 8, 2020

Related U.S. Application Data

(62) Division of application No. 15/955,829, filed on Apr. 18, 2018, now abandoned.

(51) Int. Cl.
*G06F 9/48* (2006.01)
*G06F 8/71* (2018.01)
*G06F 16/84* (2019.01)

(52) U.S. Cl.
CPC .............. *G06F 9/4856* (2013.01); *G06F 8/71* (2013.01); *G06F 16/84* (2019.01)

(58) Field of Classification Search
None
See application file for complete search history.

(56) References Cited

U.S. PATENT DOCUMENTS

| | | | | |
|---|---|---|---|---|
| 7,818,665 B1* | 10/2010 | Russin | .................. | G06F 40/197 715/236 |
| 2004/0044965 A1* | 3/2004 | Toyama | ................ | G06F 40/166 715/234 |
| 2007/0079282 A1* | 4/2007 | Nachnani | .................. | G06F 8/34 717/106 |
| 2010/0077380 A1* | 3/2010 | Baker | ....................... | G06F 8/71 717/120 |
| 2017/0048314 A1* | 2/2017 | Aerdts | ................ | H04L 67/1097 |

* cited by examiner

*Primary Examiner* — Scott T Baderman
*Assistant Examiner* — Steve P Golden
(74) *Attorney, Agent, or Firm* — Merchant & Gould P.C.

(57) ABSTRACT

A method and system for migrating Extensible Markup Language (XML) schemas between releases of a computing application. The method provides first and second versions of an XML document by the computing application, each version having a different schema. The first version is migrated to the second version using a migration step. The method uses a Dependency injection Framework to abstract the characteristics of the at least one migration step. The method also transforms the first schema to the second schema, based on the abstracted characteristics of the at least one migration step, in such a way that the first version of the XML document is migrated into the second version of the XML document. The method migrates the first version into the second version in such a way that the second version can access application data from the first version.

9 Claims, 4 Drawing Sheets

```
<ClassifierMap>
    <ReleaseVersion>1.0</ReleaseVersion>
    <Status>Valid</Status>
    <Id>f713e87c-5ba8-45e7-bcad-ca7eecba4eb6</Id>
    <Name>address's ClassifierMap</Name>
    <TransformationId>ac726eac-0ca8-415c-b9c2-447155a4679b</TransformationId>
    <SourceClassifierIds>
        <SourceClassifierId>710f15b3-d806-433c-b030-8990563ed5b6</SourceClassifierId>
    </SourceClassifierIds>
    <ClassifierMapTargets>
        <!--Content Not Listed-->
    </ClassifierMapTargets>
</ClassifierMap>
```

*FIG. 1A*

```
<ClassifierMap>
    <ReleaseVersion>2.0</ReleaseVersion>
    <Status>Valid</Status>
    <Id>f713e87c-5ba8-45e7-bcad-ca7eecba4eb6</Id>
    <Name>address's ClassifierMap</Name>
    <TransformationId>ac726eac-0ca8-415c-b9c2-447155a4679b</TransformationId>
    <ClassifierMapSources>
        <ClassifierMapSource>
            <Id>e5a0838b-14a9-4a7f-a42d-d8aa11d14e9a</Id>
            <ClassifierMapId>f713e87c-5ba8-45e7-bcad-ca7eecba4eb6</ClassifierMapId>
            <ClassifierId>710f15b3-d806-433c-b030-8990563ed5b6</ClassifierId>
        </ClassifierMapSource>
    </ClassifierMapSources>
    <ClassifierMapTargets>
        <!--Content Not Listed-->
    </ClassifierMapTargets>
</ClassifierMap>
```

*FIG. 1B*

METHOD AND SYSTEM FOR MIGRATING XML SCHEMAS IN APPLICATION RELEASES

CROSS REFERENCE TO RELATED APPLICATION

This application is a divisional of co-pending U.S. patent application Ser. No. 15/955,829, entitled "Method and System for Migrating XML Schemas in Applications Releases," filed on Apr. 18, 2018, the entire disclosure of which is hereby incorporated herein by reference.

BACKGROUND

Field

The instant disclosure relates generally to computing applications involving Extensible Markup Language (XML) documents, and in particular to methods and systems for migrating XML schemas between releases of computing applications.

Description of the Related Art

A markup language is a computer language designed for the processing, definition and presentation of text. A markup language specifies code for formatting, both the layout and style, within a text file. The code used to specify formatting and define elements within a document are called tags. A markup language is human-readable, rather than typical computer language programming syntax. One of the two most popular markup languages is Extensible Markup Language (XML). XML is a markup language that defines a set of rules for encoding documents in a format that is both human-readable and machine-readable.

XML provides a lightweight and strongly typed way to persist the data and state of a computing application, i.e., to have the computing application data and the computing application state survive after the process with which they were created has ended. The schema (i.e., the organization and structure) of an XML document may change between releases of a computing application. If the schema of the XML document changes, then the current release of the computing application likely will not be able to access the application data from a previous release, thereby creating an incompatibility between releases of the same computing application.

There is a need for a method and system for migrating XML schemas between releases of computing applications.

SUMMARY

Disclosed is a method and system for migrating Extensible Markup Language (XML) schemas between releases of a computing application. The method includes providing a first version of an XML document by the computing application, in which the first version of the XML document has a first schema. The method also includes providing at least one second version of an XML document by the computing application, in which the second version of the XML document has a second schema that is different than the first schema. The method also includes migrating the first version of the XML document to the second version of the XML document using a migration step. The method also includes using a Dependency Injection Framework to abstract the characteristics of the at least one migration step. The method also includes transforming the first schema to the second schema, based on the abstracted characteristics of the at least one migration step, in such a way that the first version of the XML document is migrated into the second version of the XML document. The method migrates the first version of the XML document into the second version of the XML document in such a way that the second version of the XML document can access application data from the first version of the XML document.

BRIEF DESCRIPTION OF THE DRAWINGS

FIGS. 1a and 1b are schematic views of example schema changes between two releases of an Extensible Markup Language (XML) document;

DETAILED DESCRIPTION

Figure 2:
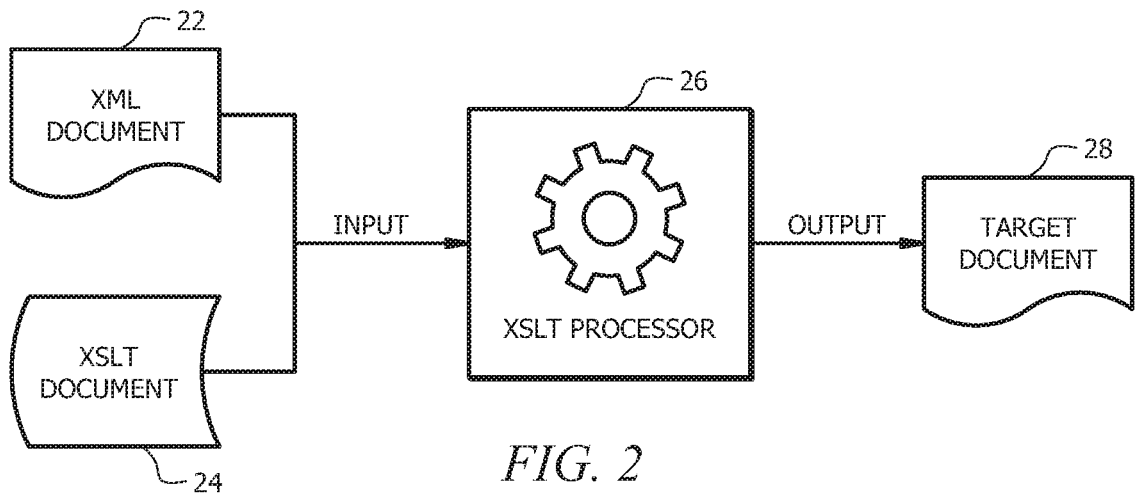
FIG. 2 is a schematic view of the transformation of an XML document using Extensible Stylesheet Language Transformation (XSLT)

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting, and merely set forth some of the many possible embodiments for the claimed invention.

FIGS. 1a and 1b are schematic views of example schema changes between two releases of an Extensible Markup Language (XML) document (or object) 10, i.e., a document or object whose data is formatted in the XML language. For example, as discussed hereinabove, the schema of an XML document may change between releases of an application. FIG. 1a illustrates a first version (e.g., release version 1.0) of the XML document 10. FIG. 1b illustrates a second version (e.g., release version 2.0) of the XML document 10.

The XML document 10 includes a number of lines of data 12 in XML format. A first highlighted portion or node 14 of the data 12 shown in FIG. 1a and a second highlighted portion or node 16 of the program data 12 shown in FIG. 1b note the changes that have occurred between the first version (e.g., release version 1.0) of the XML document 10 and the second version (e.g., release version 2.0) of the XML document 10. All of the remaining data 12 is the same in both the first version (e.g., release version 1.0) of the XML document 10 and the second version (e.g., release version 2.0) of the XML document 10.

Because of the changes made between the first version (e.g., release version 1.0) of the XML document 10 and the second version (e.g., release version 2.0) of the XML document 10, conventional data format conversions or transformations become problematic. For example, using conventional data format conversions or transformations, deserializing the XML document 10 serialized from the first version (e.g., release version 1.0) of the XML document 10 into the second version (e.g., release version 2.0) of the XML document 10 will be unsuccessful. Serialization is a process by which the state of an object (e.g., an XML document) is transformed or converted into a form (e.g., a serial data format or data stream) that can be readily transported. Once the serialized object has been transported, the serialized data stream is converted back into its object form (i.e., deserialized). However, because of a mismatch between the representation of the data structures of the two versions of the XML document 10, deserializing the XML document 10 serialized from the first version (e.g., release version 1.0) of the XML document 10 into the second version (e.g., release version 2.0) of the XML document 10 using conventional data format conversions or transformations will fail.

As will be discussed in greater detail hereinbelow, according to an embodiment, problems associated with the incompatibility of releases of the same XML document are overcome by abstracting a layer of interfaces of the XML schema migration and then using a Dependency Injection Framework to manage or fulfill all of the dependencies that are needed for the XML migration to be performed. According to an embodiment, the XML migration involves one or more migration steps that use an Extensible Stylesheet Language Transformation (XSLT) to convert the structure of the XML document.

FIG. 2 is a schematic view 20 of the transformation of an XML document by applying Extensible Stylesheet Language Transformation (XSLT), i.e., using an XSLT document 24 and an XSLT processor 26. Extensible Stylesheet Language Transformation is an XML-related technology that provides a way to automatically transform an XML document from one format or version to another format or version. As shown in FIG. 2, a first version (e.g., release version 1.0) of an XML document (shown as a source XML document 22) and the XSLT document 24 are input to the XSLT processor 26, and the XSLT processor 26 generates a second version (e.g.; release version 2.0) of the XML document (shown as a target XML document 28).

The XSLT processor 26 contains a set of rules to transform the source XML document 22 into the target XML document 28. Using the XSLT processor 26, the pattern of the element (i.e., the structure of the source XML document 22) is identified in the source XML document 22. The XSLT processor 26 then applies an appropriate template from the XLST document 24 to create the target XML document 28, As the target XML document 28 is being generated, the XML elements/structure in the source XML document 22 are filtered and reordered, and an arbitrary structure is added.

Figure 3:
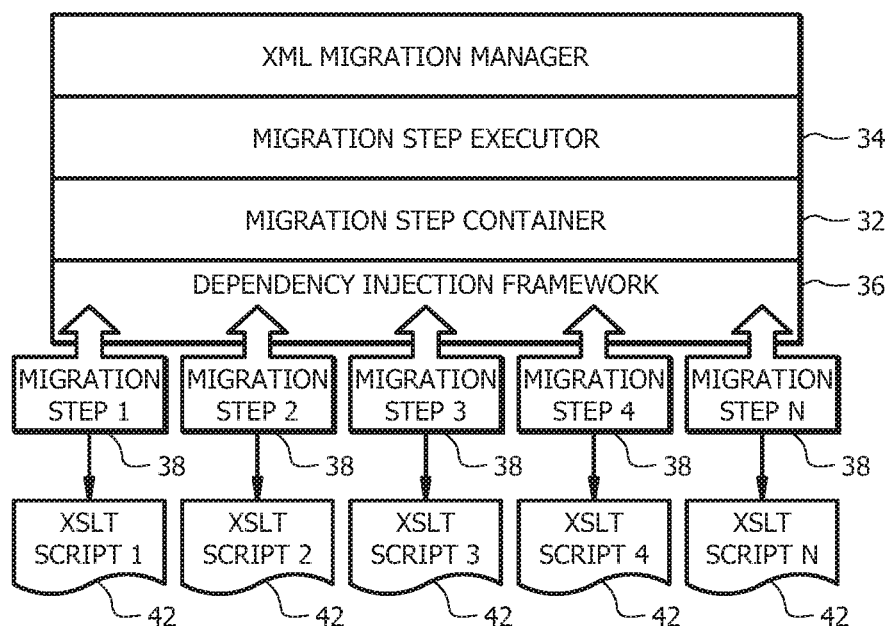
FIG. 3 is a schematic view of an XML Migration Manager, according to an embodiment.

FIG. 3 is a schematic view of an XML Migration Manager 30, according to an embodiment. The XML Migration Manager 30 includes a Migration Step Container component 32 and a Migration Step Executor component 34. The XML Migration Manager 30 also includes or works with a Dependency injection Framework (DIF) 36. According to an embodiment, the XML Migration Manager 30 works with a plurality of Migration Steps 38 (e.g., Migration Step 1, Migration Step 2, Migration Step 3, Migration Step n). The Migration steps 38 are an abstraction of the migration processing Links) coupled between two adjacent versions of the XML document.

The XML Migration Manager 30 can be a standalone computing device, machine or system, or a group of standalone computing devices, machines or systems. That is, one or more of the Migration Step Container component 32, the Migration Step Executor component 34 and the Dependency Injection Framework 36 can be a standalone computing device, machine or system, or a group of standalone computing devices, machines or systems. Regardless of the particular configuration of the XML Migration Manager 30, it should be understood that the relationship between the Migration Step Container component 32, the Migration Step Executor component 34 and the Dependency Injection Framework 36 is a machine-to-machine connection, and involves machine-to-machine communications, Le the exchange of data between machines.

Each of the Migration Steps 38 contains an XSLT script or program (e.g., XSLT script 1, XSLT script 2, XSLT script 3, XSLT script n) to transform the XML document from one version to the next version, and each Migration Step 38 exports itself to the XML Migration Manager 30 via the Dependency Injection Framework (DIF) 36. The XML Migration Manager 30 is the core component that collects all of the Migration Steps 38, and then processes the migration.

Dependency injection is a design pattern (i.e., a general, reusable template or approach) that decouples dependencies between a first object and a second object that is dependent on the first object. A dependency is a reliance of one data document, application or object on another data document, application or object. By decoupling dependencies between a first object and a second dependent object, Dependency injection allows changes to be made to the first object without requiring changes to be made to the dependent second object just because changes were needed to the first object.

According to an embodiment, the Dependency Injection Framework 36 uses Dependency Injection principles to manage, e.g., remove, the dependencies between the XML Migration Manager 30 and the Migration Steps 38 so that the XML Migration Manager 30 does not need to know the Migration Steps 38 beforehand. Conventionally, when an application designs an XML document migration mechanism, the application must know how the XML schema within the XML document will be changed in future releases of the XML document. However, according to an embodiment, by having the Dependency injection Framework 36 manage the dependencies between the XML Migration Manager 30 and the Migration Steps 38 using Dependency Injection, the XML Manager 30 manages the information for each migration in a future release of the XML document without needing to know the XML schema beforehand. This is possible by using an abstract layer to abstract all of the characteristics of the migration (i.e., the current/source XML version, the target XML version and the XSLT document used to perform the XML transformation), so that when a new migration is executed, the only thing needed is to instruct the XSLT processor 26 how to convert the XML document.

As discussed hereinabove, the XML Migration Manager 30 has two core components: the Migration Step Container component 32 and the Migration Step Executor component 34. The Migration Step Container component 32 stores ail of the migration steps that are collected by the Dependency Injection Framework 36. The Migration Step Container component 32 also determines a migration path from the first or begin version of the XML document to the last or end version of the XML document.

The Migration Step Executor component 34 communicates with the Migration Step Container component 32 to fetch the migration path. The Migration Step Executor component 34 then executes the migration path step-by-step. As the Migration Step Executor component 34 executes each migration step, the Migration Step Executor component 34 uses the XSLT processor 26 (FIG. 2) to transform the XML document from one version to the next version.

The Migration Step Container component 32 and the Migration Step Executor component 34 depend on a set of Interfaces (shown in FIG. 4), which abstract all of the logic associated with the migration. Meanwhile, all of the migration steps also inherit the properties and methods from the same set of interfaces and provide concrete migration logic. Therefore, although the XML Migration Manager 30 does not have any knowledge about the concrete migration steps, the XML Migration Manager 30 can still execute the migration steps when an application is running.

Figure 4:
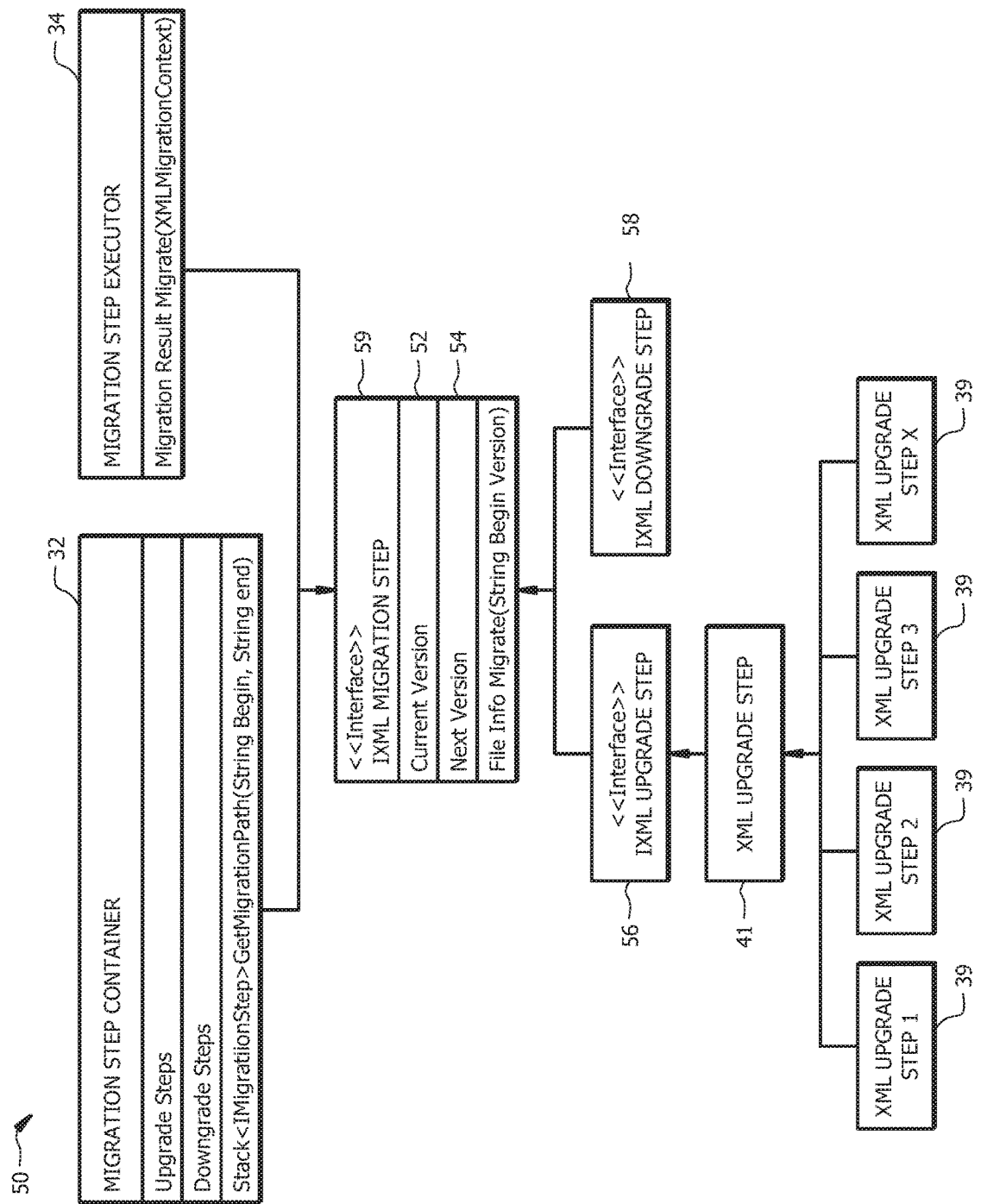
FIG. 4 is a schematic view of a class diagram illustrating the relationship between the different objects that are used in FIG. 3, according to an embodiment.

FIG. 4 is a schematic view of a class diagram 50 illustrating the relationship between the different objects that are used in FIG. 3, according to an embodiment. Each of the Migration Steps 38 shown in FIG. 3 (i.e., Migration Steps 1-N) are represented as XMLUpgrade Steps 39 in FIG. 4 (i.e., XMLUpgradeStep1, XMLUpgradeStep2, XMLUpgradeStepx). Also, an XMLUpgradeStep 41 is a base class that represents the upgrade migration step.

According to an embodiment, the migration method supports both the upgrade of an XML document (e.g., release version 1.0 of an XML document to release version 2.0 of the XML document) as well as the downgrade of an XML document (e.g., release version 2.0 of an XML document to release version 1.0 of the XML document). An IXMLUpgradeStep box 56 is an interface that represents the upgrade migration step. An IXMLDowngradeStep box 58 is an interface that represents the downgrade migration step. It should be understood that although only the upgrade migration step is shown in detail, both the upgrade migration step and the downgrade migration step are similarly executed.

The Migration Step Container component 32 is a sub-component of the XML Migration Manager 30 as discussed hereinabove. The Migration Step Container component 32 declares its dependencies through, the Dependency Injection Framework 36. The Migration Step Container component 32 then fills in these dependencies with all of the migrations steps 38. After receiving all of the migration steps 38, the Migration Step Container component 32 stores the migration steps 38 into a dictionary for calculating the migration path from one version of the XML document to another version of the XML document.

Each migration step has two properties: a CurrentVersion 52 and a NextVersion 54. The CurrentVersion 52 is the version of the XML document 10 on which the migration step is applied. The NextVersion 54 is the version of the XML document 10 that is generated after executing the migration step. The CurrentVersion 52 and the NextVersion 54 are included within an IXMLMigrationStep 59, which is an interface that represents an abstraction of the migration step, which can be either an upgrade migration step or a downgrade migration step. By abstracting the Migration Steps 38, the Dependency Injection Framework 36 (and thus the XML Migration Manager 30) is no longer dependent on the Migration Steps 38. Instead, the Dependency Injection Framework 36 (and the XML Migration Manager 30) becomes dependent on the IXMLMigrationStep 59, as do the Migration Steps 38.

According to an embodiment, each migration step 38 performs similarly to a singly linked list, in which one step points to the next step. When two versions of an XML document 10 are input into the Migration Step Container component 32, the Migration Step Container component 32 is able to determine a migration path, which a sequence of migration steps from the first or begin version of the XML document 10 to the last or end version of the XML document.

Figure 5:
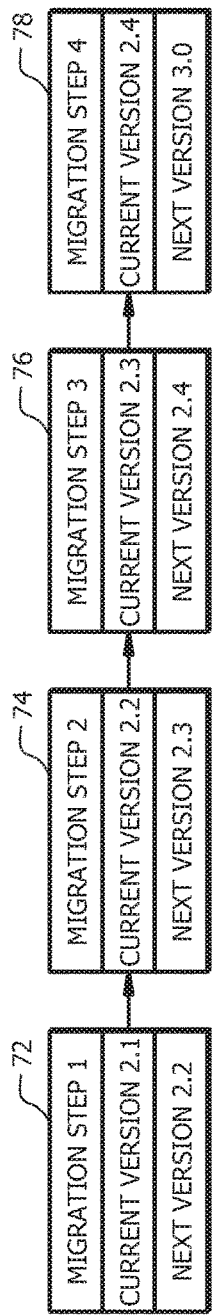
FIG. 5 is a schematic view of an example migration path used by the XML Migration Manager, according to an embodiment.

FIG. 5 is a schematic view of an example migration path 70 used by the XML Migration Manager 30, according to an embodiment. The example migration path 70 is a migration path from an XML document version 2.1 to an XML document version 3.0. As shown, the migration path 70 includes a first migration step 72 (i.e., Migration Step 1), in which the Current Version is XML document version 2.1 and the Next Version is XML document version 2.2. The migration path 70 also includes a second migration step 74 (i.e., Migration Step 2), in which the Current Version is XML document version 2.2 and the Next Version is XML document version 2.3. The migration path 70 also includes a third migration step 76 (i.e., Migration Step 3), in which the Current Version is XML document version 2.3 and the Next Version is XML document version 2.4. The migration path 70 also includes a fourth migration step 78 (i.e., Migration Step 4), in which the Current Version is XML document version 2.4 and the Next Version is XML document version 3.0

As discussed hereinabove, the Migration Step Executor component 34 is another sub-component of the XML Migration Manager 30. The main responsibility of the Migration Step Executor component 34 is to query the Migration Step Container component 32 to retrieve the migration path. After retrieving the migration path, the Migration Step Executor component 34 iterates through each migration step to execute its migrate method, which uses the XSLT processor 26 (FIG. 2) to perform the transformation. When the migration is completed, the Migration Step Executor component 34 reports the migration status and/or any handle errors.

One of the features of the Migration Manager 30 and its migration method is greater extensibility (i.e., the ability to accommodate future growth) compared to conventional migration methods. The improved extensibility of the Migration Manager 30 and its migration method is the result of several features. First, all of the migration steps performed by the Migration Manager 30 are pluggable in the Migration Manager 30 with the help of the Dependency Injection Framework 36, as shown in FIG. 3.

Second, the Migration Step Container component 32 and the Migration Step Executor component 34 do not depend on any of the concrete migration steps. According to an embodiment, the Migration Step Container component 32 and the Migration Step Executor component 34 apply the Inversion of Control (Ioc) Principle. That is, the flow of control, i.e., the functions performed by the Migration. Step Container component 32 and the Migration Step Executor component 34 as part of the migration method, is received from a generic framework, i.e., the Dependency Injection Framework 36. The use of the Inversion of Control (Ioc) Principle increases modularity of the migration method, and thus makes the migration method more extensible.

Third, an XSLT script is embedded within each migration step. The embedded XSLT script is processed by the XSLT processor 26 (FIG. 2). By using XLST technology; the XML Migration Manager 30 eliminates a lot of duplicate source code for the XML document processing.

According to an embodiment, other features of the migration method described herein demonstrate improved extensibility compared to conventional migration methods. For example, the migration method described herein not only supports the upgrade of an XML document, but also supports the downgrade of an XML document by providing downgrade migration steps. According to an embodiment, the downgrade migration steps are performed by the Migration Step Container component 32 and the Migration Step Executor component 34 in the same manner as the upgrade steps are performed.

Also, the migration method described herein reduces the effort involved in modifying the source code for a migration between chronological releases. According to an embodiment, only one new migration step is added, but no other modifications are required to the migration method.

Figure 6:
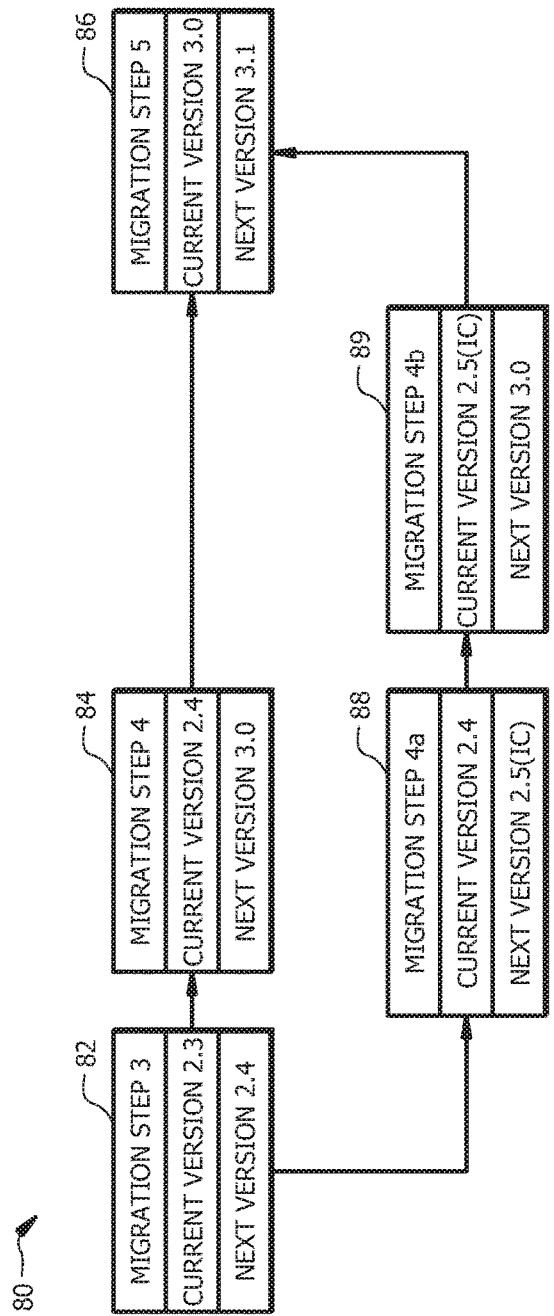
FIG. 6 is a schematic view of a portion of an example migration involving a later released Interim Correction (IC) using the XML Migration Manager, according to n embodiment.

Also, the migration method described herein reduces the effort involved in delivering a patch for a migration from an Interim Correction (IC) released later to a higher version, which is released earlier. FIG. 6 is a schematic view of a portion of an example migration 80 using the XML Migration Manager 30, according to an embodiment, in which an Interim Correction (IC) is released later than the earlier released higher version. The example migration path 80 is a migration path from an XML document version 2.3 to an XML document version 3.1. As shown, the migration path 80 includes a migration step 82 (i.e., Migration Step 3), in which the Current Version is XML document version 2.3 and the Next Version is XML document version 2.4. The migration path 80 also includes another migration step 84 (i.e., Migration Step 4), in which the Current Version is XML document version 2.4 and the Next Version is XML document version 3.0. The migration path 70 also includes another migration step 86 (i.e., Migration Step 5), in which the Current Version is XML document version 3.0 and the Next Version is XML document version 3.1.

However, according to an embodiment, if an Interim Correction (IC) is later released, the migration path 80 includes a new migration step 88, 89 (i.e., Migration Step 4a and Migration Step 4b) as a patch. In the new migration step 88, the Current Version is XML document version 2.4 and the Next Version is XML document version (IC), and in the new migration step 89, the Current Version is XML document version 2.5 (IC) and the Next Version is XML document version 3.0.

According to an embodiment, the migration method described herein can be used to migrate other data, with relatively little modification to the migration method. For example, for database migration, the XSLT script is replaced with a Structured Query Language (SQL) script.

It will be apparent to those skilled in the art that many changes and substitutions can be made to the embodiments described herein without departing from the spirit and scope of the disclosure as defined by the appended claims and their full scope of equivalents.

The invention claimed is:

1. A method for migrating Extensible Markup Language (XML) schemas between releases of a computing application, the method comprising:
   providing a first version of an XML document by the computing application, the first version of the XML document having a first schema; and
   providing at least one second version of an XML document by the computing application, the second version of the XML document having a second schema, wherein the second schema is different than the first schema;
   migrating the first version of the XML document to the second version of the XML document using at least one migration step;
   collecting, at a Dependency Injection Framework, the at least one migration step and storing, within a migration step container, the at least one migration step;
   using the Dependency Injection Framework to remove any dependencies between the first version of the XML document and the second version of the XML document by abstracting the characteristics of the at least one migration step;
   determining a migration path based on the first version of the XML document and the second version of the XML document;
   fetching the migration path from the migration step container; and
   transforming the first schema to the second schema, based on the abstracted characteristics of the at least one migration step, in such a way that the first version of the XML document is migrated into the second version of the XML document,
   wherein the first version of the XML document is migrated into the second version of the XML document in such a way that the second version of the XML document can access application data from the first version of the XML document.

2. The method as recited in claim 1, wherein migrating the first version of the XML document into a second version of the XML document uses an Extensible Stylesheet Language Transformation (XSLT) to convert the structure of the XML document from the first version of the XML document to the second version of the XML document.

3. The method as recited in claim 1, wherein migrating the first version of the XML document into a second version of the XML document comprises:
   inputting the first version of the XML document into an Extensible Stylesheet Language Transformation (XSLT) processor,
   inputting an XSLT document into the XSLT processor, and
   applying Extensible Stylesheet Language Transformation by the XSLT processor to generate the second version of the XML document.

4. The method as recited in claim 3, wherein the XSLT processor:
   identifies the structure of the first version of the XML document, and
   applies a template from the XSLT document to generate the second version of the XML document.

5. The method as recited in claim 3, wherein the XSLT processor:
   filters the structure of the first version of the XML document,
   reorders the structure of the first version of the XML document, and
   adds an arbitrary structure to the first version of the XML document.

6. The method as recited in claim 3, wherein the characteristics of the at least one migration step include the first version of the XML document, the second version of the XML document, and the XSLT document.

7. The method as recited in claim 6, wherein the first version of the XML document is migrated to the second version of the XML document without the application performing the migration being dependent on the at least one migration step.

8. The method as recited in claim 1, wherein the first version of the XML document is released before the second version of the XML document, and wherein migrating the first version of the XML document to the second version of the XML document comprises an upgrade migration step.

9. The method as recited in claim 1, wherein the second version of the XML document is released before the first version of the XML document, and wherein migrating the first version of the XML document to the second version of the XML document comprises a downgrade migration step.

\* \* \* \* \*